(12) United States Patent
Marshall et al.

(10) Patent No.: US 9,967,506 B2
(45) Date of Patent: May 8, 2018

(54) RUGGEDIZED MODULAR MARINE DISPLAY

(71) Applicant: Electronic Technologies, LLC, Minneapolis, MN (US)

(72) Inventors: Jon David Marshall, Lindstrom, MN (US); Steven Ronald Hanson, Brainerd, MN (US); Rocky Joseph Holmes, Pine River, MN (US)

(73) Assignee: ELECTRONIC TECHNOLOGIES, LLC, Minneapolis, MN (US)

( * ) Notice: Subject to any disclaimer, the term of this patent is extended or adjusted under 35 U.S.C. 154(b) by 292 days.

(21) Appl. No.: 14/718,365

(22) Filed: May 21, 2015

(65) Prior Publication Data

US 2015/0341562 A1    Nov. 26, 2015

Related U.S. Application Data

(60) Provisional application No. 62/002,422, filed on May 23, 2014.

(51) Int. Cl.

| H04N 5/44 | (2011.01) |
|---|---|
| G01S 15/89 | (2006.01) |
| G10K 11/00 | (2006.01) |
| H04N 7/18 | (2006.01) |
| G01S 15/96 | (2006.01) |
| G01S 15/02 | (2006.01) |
| G01S 7/521 | (2006.01) |
| G01S 7/56 | (2006.01) |
| H04N 1/00 | (2006.01) |

(Continued)

(52) U.S. Cl.
CPC ............... *H04N 5/44* (2013.01); *G01S 7/521* (2013.01); *G01S 7/56* (2013.01); *G01S 15/025* (2013.01); *G01S 15/89* (2013.01); *G01S 15/96* (2013.01); *G10K 11/00* (2013.01); *H04N 1/00* (2013.01); *H04N 5/2252* (2013.01); *H04N 5/23241* (2013.01); *H04N 7/183* (2013.01)

(58) Field of Classification Search
CPC . H04N 7/18; H04N 5/225; H04N 5/44; G06F 3/0488; G06F 15/00; G01S 15/96; G01S 7/529; G06K 9/00; G01C 21/20
USPC .......................................................... 348/81
See application file for complete search history.

(56) References Cited

U.S. PATENT DOCUMENTS

| 5,444,441 A * | 8/1995 | Sutton ..................... G01S 17/89 340/850 |
|---|---|---|
| 7,268,703 B1 * | 9/2007 | Kabel .................. G01C 21/203 340/984 |
| 8,433,463 B1 | 4/2013 | Lieberman et al. |

(Continued)

OTHER PUBLICATIONS

"Buy Vexilar Ice Fishing Flashers," Ice Fishing Today. Accessed Apr. 22, 2014.

*Primary Examiner* — James M Pontius
*Assistant Examiner* — Patrica I Young
(74) *Attorney, Agent, or Firm* — The Dobrusin Law Firm, P.C.; Daniel P. Aleksynas (57) ABSTRACT

An image module comprising: (a) an imaging device that graphically or pictorially captures images of underwater sea life (b) a module housing including one or more components that processing an image generated by the imaging device; wherein the image module is discrete from a marine display and is capable of being connected to the marine display so that the graphic or pictorial images of underwater seal life captured by the imaging device are displayed.

18 Claims, 7 Drawing Sheets

(51) Int. Cl.
*H04N 5/225* (2006.01)
*H04N 5/232* (2006.01)

(56) References Cited

U.S. PATENT DOCUMENTS

| | | | |
|---|---|---|---|
| 2001/0048468 A1* | 12/2001 | Fantone | A01K 79/00 348/81 |
| 2013/0328828 A1 | 12/2013 | Tate | |
| 2014/0010043 A1 | 1/2014 | Pawlik et al. | |
| 2014/0013259 A1 | 1/2014 | Thomas et al. | |
| 2014/0013270 A1 | 1/2014 | Thomas et al. | |
| 2014/0013276 A1 | 1/2014 | Butterworth | |

\* cited by examiner

RUGGEDIZED MODULAR MARINE DISPLAY

FIELD

The present teachings relate to a marine display and associated component or displaying positioning data, graphic, and/or pictorial data relating to underwater sea life.

BACKGROUND

Outdoor sports men and women that hunt and fish are using more and more technology to track their position, return to a predetermined position, and locate game and fish. Many sportspeople carry a global positioning device (GPS) that keeps track of their location while they are in the woods or on the water so that a current location can be tracked and/or a position may be saved so that the sportsperson can return to the same location at a later time. These sportspeople when fishing, for example, may also carry a fish finder to assist in locating fish; the depth of the fish, or the like thus requiring the sportsperson to carry multiple devices in order to accommodate all of their needs, Many of these fish finders are the "flasher type" that provides a flashing light indicating a fish is located at a predetermined depth. The display portion provides little additional information other than the presence of a fish. The fish finders include only one detection device so that only one location is monitored at a time. Attempts have been made to provide more detailed display devices that also provide other functionality such as GPS. However, coupling additional functionality together increases prices above a price point such that users may be detracted from purchasing the device, increases complexity of the devices, and may make the device and added functionality bulky.

Examples of marine display devices are disclosed in U.S. Pat. No. 8,433,463; and U.S. patent application Publication No. 2014/0010043; 2014/0013259; 2014/0013270; and 2014/0013276 all of which are expressly incorporated by reference in their entirety herein for all purposes. It would be attractive to have a marine display that is modular so that functionality may be added and removed as needed. It would be attractive to have a marine display that may be used when the user's hands are covered in gloves so that the user can use the device in cold temperatures without having to remove their gloves. What is needed is a device that monitors a plurality of locations simultaneously, What is needed is a device that allows a user to remotely monitor one or more locations simultaneously. What is needed is a docking station that remotely and/or locally provides information and/or power to a marine display.

SUMMARY

One possible example of the present teachings include: an image module comprising: (a) an imaging device that graphically or pictorially captures images of underwater sea life (b) a module housing including one or more components that processes an image generated by the imaging device; wherein the image module is discrete from a marine display and is capable of being connected to the marine display so that the graphic or pictorial images of underwater seal life captured by the imaging device are displayed.

One possible embodiment of the present teachings include: a marine display device comprising: (a) a housing including one or more ports for connecting with one or more imaging devices that graphically or pictorially capture images of underwater sea life, (b) a display screen located within the housing that displays the graphical or pictorial images of underwater sea life, displays one or more global positioning satellite locations, one or more menu options, or a combination thereof, and (c) one or more sensors for detecting contact of the display screen by the user so that the contact by the user controls one or more functions of the marine display device; wherein the one or more sensors detect the contact of the user when the user is wearing gloves and the user is making contact with one or more fingers.

Another possible embodiment of the present teachings include: a marine display device comprising: (a) a housing including one or more ports for connecting with one or more imaging devices that graphically or pictorially capture images of underwater sea life, (b) a display screen located within the housing that displays the graphical or pictorial images of underwater sea life, displays one or more global positioning satellite locations, one or more menu options, or a combination thereof, (c) one or more sensors for detecting contact of the display screen by the user so that the contact by the user controls one or more functions of the marine display device; and (d) one or more internal power supplies; wherein the marine display device is and displays the graphical or pictorial images of underwater sea life without being connected to an external power source.

The present teachings provide: a marine streaming device composing: (a) a carrier and (b) a housing connected to the carrier, the housing including: (i) one or more attachment points for receiving one or more image modules; (ii) one or more antennas that transmit wireless signals received from the one or more image modules; and (iii) one or more power packs; and wherein the marine streaming device transmits the wireless signals to one or more marine display devices so that the one or more display devices display graphic or pictorial images of underwater sea life.

The present teachings provide: a method comprising: (a) connecting one or more image modules to one or more display device, a streaming device, or both; (b) placing one or more imagining devices in water; (c) transmitting a signal from each of the one or more imaging devices to the image module; (d) converting the signal from each of the one or more imaging devices; and (e) displaying the converted signal on the one or more display devices.

The present teachings provide a marine display that is modular so that functionality may be added and removed as needed. The present teachings provide a marine display that may be used when the user's hands are covered in gloves so that the user can use the device in cold temperatures without having to remove their gloves. The present teachings provide a device that monitors a plurality of locations simultaneously. The present teachings provide a device that allows a user to remotely monitor one or more locations simultaneously. The present teachings provide a docking station remotely and/or locally provides information and/or power to a marine display.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present application claims priority to U.S. Patent Application Ser. No. 62/002,422, filed on May 23, 2014 the teachings of which are incorporated by reference herein in its entirety for all purposes.

The display device may function to provide access to information, location information, graphical information, pictorial information, or a combination thereof. The display device may function to connect to one or more image modules, one or more imaging devices, one or more streaming devices, or a combination thereof. The display device may be a handheld device, a mounted device, portable, or a combination thereof. The display device may be handheld and portably used without any other external devices such as power. The display device may be ruggedized. The display device may include global positioning satellite (GPS) functionality. The display device may include functionality for processing graphical or pictorial images produced from an imaging device. Preferably, the display device is free of any functionality for processing graphical or pictorial images. The display device may include one or more buttons for controlling the display device. The display device may be free of buttons. The display device may include a single button. The display device may display an image generated from a signal provided across a wire. The display device may receive data from wireless communication (e.g., via Bluetooth, near field communication (NFC). The display device may receive signals from a USB port, a docking port, a HD video port, screen recording, display port, or a combination thereof. The display device may include a display screen that is substantially the same size and the display device.

The display screen may function to display information, control the display device, or both. The display screen may display one or more buttons for controlling the display device. The display screen may be made of a material that is substantially resistant to cracking, breaking, shattering, or a combination thereof. The display screen may be made of poly(methyl methacrylate), alkali-aluminosilicate, borosilicate glass, or a combination thereof. The display may be made of a material that allows sensing through the material so that sensors in the display device may sense a user, a users movement, or both.

The display may include one or more sensors that function to sense contact by a user. The display may include a plurality of sensors that sense touch, movement, or both by a user. The one or more sensors may be resistive sensors. The one or more sensors may be capacitive sensors. Preferably, the plurality of sensors are capacitive sensors. The sensors may sense contact by a user. Preferably, the sensors are sufficiently sensitive so that the sensors sense user contact when the user is wearing a hand covering such as wearing gloves. More preferably, the sensors are sufficiently sensitive that the sensors sense user contact through a hand covering such as gloves. An example of a sensor that may be used to detect capacitance of a user wearing a glove is found in U.S. Patent Application publication no. 2013/0328828 the teachings of which are incorporated in their entirety herein for all purposes. The one or more sensors may allow for wet finger tracking. The one or more sensors may sense a finger that is damp or is covered by water and the one or more sensors may be able to filter the signal so that the finger is accurately tracked. The one or more sensors may filter snow, fluid, or other debris from a finger so that the movement of a user is tracked irrelevant of the external factors such as snow, water, ice, wet fingers, or a combination thereof. The one or more sensors function to have wet rejection. The one or more sensors may distinguish between a finger and water. The one or more sensors may reject changes due to water. The one or more sensors may monitor movements of a user while the user is wet, the device has water on the sensing surface, or both. The one or more sensors may reject signals generated by water or fluid. For example, the one or more sensors may distinguish between water, a water covered finger, and a dry finger so that the sensor may respond to the commands of the user. The one or more sensors, the one or more display screens, the display device, or a combination thereof may be covered by, protected by, surrounded by, or a combination thereof one or more protective bumpers.

The one or more protective bumpers may function to protect the display device, protect the display device from shock, protect the display device from fluids, protect the display device from impact, or a combination thereof. The one or more protective bumpers may cover one or more corners, sides, edges, surfaces, or a combination thereof of the display device. The one or more protective bumpers may be a single protective bumper that extends around a periphery of the display device. The one or more protective bumpers may be fluid resistant, may provide a fluid resistant layer, a fluid resistant barrier, or a combination thereof. The one or more protective bumpers may be sufficiently thick so that upon impact the display device is protected from damage. The one or more protective bumpers may have a thickness that is about 1 mm or more, about 2 mm or more, or even about 3 mm or more. The one or more protective bumpers may have one or more molded portions, formed portions, or both. The one or more protective bumpers may include one or more gripping portions.

The one or more gripping portions may function to increase gripping of the display device. Preferably, the one or more gripping portions function to increase gripping of the display device when the user is wearing hand coverings such as mittens or gloves. The one or more gripping portions may extend around a periphery of the display device. The one or more gripping portions may be on one or more sides of the display device, one or more edges of the display device, or both. Preferably, the gripping portions are located on two opposing edges of the display device. The one or more gripping portions may be located on opposing sides of one or more through holes in the protective bumpers. The one or more through holes may permit one or more buttons, one or more switches, one or more control devices, or a combination thereof to extend through the one or more gripping portions so that a user has access to the one or more buttons, one or more switches, one or more control devices, or a combination thereof.

The one or more switches may function to control the display device. The one or more switches may function to turn the display device on and off. The one or more switches may reset the display device. The one or more switches may extend through an attachment stand.

The one or more attachment stands may function to support the display device so that the display device is in an elevated position so that the display is visible to one or more users. The one or more attachment stands may function to mount the display device in a display stand. The one or more attachment stands may have one or more connection points. The one or more connection points may physically connect the display device, the attachment stand or both to a stand. The one or more connection points may be one or more threaded members that connect one or more components to the attachment stand and are adjustable, removable, or both to connect the display device, the attachment stand, or both to a display stand. The one or more connection points may be a bolt, a screw, a wing-nut, a locking member, a male and female connector, or a combination thereof. The one or more attachment stands may include one or more self-supporting stands. For example, the self-supporting stands may be a kick stand that props up the display device. The one or more attachment stands may prop up the display device so that one or more displays on the display device are visible to a user. The one or more attachment stands may include and/or be connected to one or more docking cradles, docking cradles, or both.

The one or more docking cradles may function to support the display device, connect the display device to a stand, act as a stand, or a combination thereof. The one or more docking cradles may include one or more through holes for accessing the one or more ports. The docking cradles may provide protection to the display device. The one or more docking cradles may assist in aligning the one or more image modules with the one or more display devices. The one or more docking cradles may connect to a rear of the display device. The docking cradle may include one or more ports. At least one of the one or more ports may be a power port. The power port may automatically connect to the display device. The display device upon connection with the power port of the docking cradle may automatically switch to the power supplied through the docking cradle. For example, upon docking the power source may be switched from an internal power source to an external power source. The external power source may be a wired power source, a hard wired power source, a battery, or a combination thereof. The external power source may charge the internal power source (e.g., an internal lithium ion battery). The one or more docking cradles may be connected by one or more latches. The one or more latches may allow a user to remove the one or more docking cradles from the display device. Preferably, the docking cradle includes at least two spaced apart latches. The latches may extend into a portion of the display device so that the docking cradle is fixedly connected to the display device. The one or more latches may be releasable so that the display device may be released from the docking cradle. The one or more latches may be used in conjunction with one or more support ledges.

The one or more support ledges may extend under a portion of the display device. The one or mare support ledges may function to support a bottom portion of a display device. The one or mare support ledges may bear the weight of the display device. The one or more support ledges may contact a longitudinal edge, a lateral edge, or both of the display device. The one or more support ledges may include a compliant material. The compliant material may prevent the support ledge from making noise, damaging, or both the display device. The support ledge may support the display device and the one or more ledges may lock the display device on the support ledge. The one or more latches may connect the docking cradles to the display device so that the display of the display device is visible to one or more users.

The display device may have a single display. The display device may provide a dual display. For example, the display device may show two sonar displays side by side or one on top of the other. The display device may display three or more displays. The display screen may be segregated into one or more, two or more, three or more, or even four or more displays so that an equal number of users may each view a separate portion of a screen. For example, when the display is set to dual display the display may show two features side by side such as two fish displays from two separate transducers or cameras. The dual display may overlay two or more displays. For example, when a camera and sonar are used simultaneously the camera display may be overlaid over the sonar so that both the sonar display and the camera display are visible on a single screen. In another example, a GPS display may be placed over a map of a lake or other feature of interest so that a precise location may be found. The display device may provide for indirect viewing.

The display device may provide for head up display. The display device may be connected to a projector, a viewing device, or both. The display device may have a port that a projector plugs into. The display device may transmit a signal to glasses (e.g., augmented reality glasses). The display device may be switched from a direct display configuration to a head up display configuration. For example, the display may have an internal projector that projects outward to create a head up display. The display device may project an image on another device or feature. For example, if the display device is used on a boat the head up display may be projected onto a windshield of the boat. However, the head up display may be displayed against a side of a shanty, a boat, a bucket, ice, storage bin, or a combination thereof so that the display is proximate to a location of focus. The heads up display may allow multiple users to view a display without looking at the display device. The display screen may project the image to create the heads up display. A projector may be located in the display device that projects the image.

The display device may display the same number of displays as there are imaging devices such as transducers, cameras, or the like connected to the display device. The display device may be connected to a plurality of imaging devices through one or more ports and the display device may have an equal number of displays as there are imaging devices.

The one or more ports may function as an input, an output, or both. The one or more ports may function to receive data from the one or more imaging devices. The one or ports may provide power (i.e., power ports) to the one or more imaging devices. The one or more ports may receive power from a power source (i.e., power ports) for charging the display device. The one or more ports may provide control signals to an imaging device so that the angle, size, strength, direction, focus, or a combination thereof of the imaging device may be changed and/or adjustment. The one or more ports may receive graphic data, pictorial data, or both. The one or more ports may connect to one or more imaging devices. The one or more ports may be a USB port, a micro USB, or both. The one or more ports may connect to a power cord, transducer, open water transducer, camera, or a combination thereof. There may be one port for each functional device (e.g., image module). For example, there may be an input port for receiving data, a power port for providing power to an image module and a control port for controlling an image module. The one or more ports may function to connect the display device to one or more modules, one or more module ports, one or more module cords, or a combination thereof.

The one or more module cords may be connected to one or more of the modules discussed herein. The one or more module cords may be connected to a transducer, an open water transducer, a camera, or a combination thereof. The one or more module cords may function to permit power, a signal, or both to be moved between an imaging device and an image module, a module, or both. The one or more module cords may function to allow an imaging device to be placed in a body of water for monitoring the sea life within the body of water. The one or more module cords may connect virtually any device to the display device. The one or more module cords may include one or more module ports.

The one or more module ports may function to connect to an imaging device, module, a port, the display device, or a combination thereof. The one or more module ports may function to allow signals, power, or both to move between two or more devices. The one or more module ports may include one or more wires and preferably a plurality of wires that allow for transmission of signals, power, or both. The one or module ports may connect to any port of the device taught herein. Preferably the one or more module ports may connect to a port located within a module.

The modules may function to adapt a display device to include any additional characteristics that are desired by a user. The modules may add function to the display device. The modules may be powered, non-powered, or both. The modules when connected to the display device may perform all or a portion of the processing of a given function. Preferably, the modules perform all of the processing when connected to a display device and pass a signal to the display device for display only. However, the display device may have to perform some processing in order to convert the signal from the module to a signal that may be displayed. The modules may include data, programs, algorithms, external computing, antennas, receivers, memory, or a combination thereof. The modules may provide global position satellite (GPS) capabilities. For example, the display device may not be used for positioning, but if positioning is desired a GPS module may be connected to the display device so that the display device now has GPS capabilities (e.g., storing locations, tracking, overlaying a current position over a satellite map and/or topography may). The modules may be hardwired, wireless, or both. The modules may provide signals via Bluetooth, near field communication, or both. For example, the modules may remain at a location of interest and monitor the location of interest and the display device may be handheld and transported while monitoring the location of interest. The modules may be image modules that may provide images to the display device.

The one or more image modules may each include a module housing, componentry such as drivers, a transducer, an open water transducer, a camera, or a combination thereof. The one or more image modules may function to receive data, process data, transmit data, or a combination thereof between an imaging device and a display device. The image module may receive data from an imaging device, filter the data, and transmit the filtered data to a display device so that the information is displayed to a user. The image module may be discrete from the display device. The image module may function wholly separate from the display device, streaming device, or both. The imaging module may include a module housing that is wired or wirelessly in communication with an imaging device.

The module housing may include one or more printed circuit boards that include one or more drivers, microprocessors, filters, memory, random access memory, analog to digital converters, digital to analog converters, compressors, decompresses, flash memory, or a combination thereof. The module housing may include and/or be connected to one or more speed processors (e.g., hall effect sensors, Doppler sensor, or both); temperature sensors (e.g., Negative Temperature Coefficient sensors, thermistors, or both); or both. The module housing may include flash memory, random access memory, or both. The module housing may include one or more analog to digital converters. The module housing may include one or more buses allow a signal to transmit from an image module to a microprocessor. The module housing may include one or more devices for compressing a signal, decompressing a signal, encoding a signal, decoding a signal, or a combination thereof. The module housing may include one or more microprocessors for processing a signal, pre-processing a signal, transmitting a signal, encoding a signal, compressing a signal, converting a signal from digital to analog, converting a signal from analog to digital, or a combination thereof. The printed circuit board may include an analog to digital converter that converts a signal and transmits the signal to a microprocessor. The module housing may include a power pack. The module housing may be free of a power pack.

The one or more power packs may function to store energy and provide power to the display device, streaming device, or both during operation. The one or more power packs may be any stored energy source that allows that system to operate. The one or more power packs may be a one or more batteries, one or more capacitors, or both. The one or more power packs may be one or more lithium ion batteries. The one or more power packs may be an integral part of the display device so that the display device is readily mobile. The one or more power packs may be internal so that a separate power source (e.g., battery) does not need to be carried and/or attached in order to transport the display device. The one or more power packs may be a plurality of lithium ion batteries. The power pack may be connected to a power source for charging, running the device, or both. The power source may be a standard outlet, a cigarette lighter, a solar panel, or a combination thereof. The display device, streaming device, or both may include a solar panel that powers the devices when the solar panel is in use. The one or more power packs may provide power to one or more image devices (e.g., one or more transducers, one or more open water transducers, one or more cameras, or a combination thereof). The one or more imaging devices may be powered by the power packs simultaneously, in series, one at a time, each by a discrete power pack, or a combination thereof.

The one or more imaging devices may be one or more transducers, one or more open water transducers, one or more cameras, or a combination thereof that may be used in parallel, in series, together, or a combination thereof. The one or more imaging devices may function to generate a pictorial image, a graphic image, or both. The one or more imaging devices may measure and/or assist in measuring water depth, water temperature, speed, turbidity, speed of water currents, or a combination thereof. The one or more imaging devices may be a digital camera, analog camera, sonar, or a combination thereof. The one or more imaging devices may include a portion above water and a portion within water. For example, a sonar system may include a transducer that is lowered into the water to produce an image.

The one or more transducers may function to send and/or receive one or more sound waves. The one or more transducers may function to detect depth, sea life, or both using sound waves. The transducers may function to be placed through a hole in ice to detect sea life. The one or more transducers may generate signals that are provided to a microprocessor and those signals may be used to generate an image, an indication, or both. For example, if a fish swims through a sound wave produced by the transducer the sound wave will return to the transducer and this signal will be provided to the microprocessor so that the microprocessor is able to determine the depth of the fish, the size of the fish, or both and graphically depict the presence of a fish such as by a symbol, blinking light, blip, or a combination thereof.

The one or more open water transducers may function to be used during motion across open water. The one or more open water transducers may function to be mounted to, installed within, moved behind, or a combination thereof a moving and/or stationary vessel and transmit sonar to determine depth, speed, sea life, or a combination thereof. The one or more open water transducers may be mounted to a front, a rear, in a hull, through the hull, or a combination thereof of a vessel (e.g. to the boat hull). The one or more open water transducers may be connected to fishing gear. For example, the open water transducer may be connected to a down rigger ball or down rigger cable. The one or more open water transducers may monitor the speed of a vessel by measuring soppier effect, using hail effect sensors, or both. The one or more open water transducers may measure the temperature at the depth of the transducer so that thermoclines, temperature gradients, or both may be monitored and/or measured by the system. The one or more open water transducers may provide a signal in the same way as the transducers and the teachings of the transducers are incorporated by reference into the open water transducers.

The camera may be any device that functions to generate a picture of underwater sea life. The camera may function to be waterproof, water resistant, or both so that the camera functions under water. The camera may take digital images, stream a digital feed, stream an analog stream, or both. The camera may hang from a line and be static. The camera may include controls so that the camera may be focused. The camera may include controls so that the camera may be rotated, moved up, moved down, moved to a location away from a suspending line, or a combination thereof. The camera may include rudders, fins, a propeller, lights, infrared sensors, infrared focusing capabilities, low light focusing, or a combination thereof. The one or more imaging devices may be connected to and include recording capabilities.

The recording capabilities may function to record GPS position, sonar data, underwater video footage, weather related information, or a combination thereof. The recording capabilities may take video footage, screen shots, have playback capabilities, or a combination thereof. The recording capabilities may be looped so that when an event occurs the recording may be started retroactively. For example, the recording may be on a ten minute loop and when an event occurs the user may save and store the previous ten minutes of events, and if the events are not stored, the events will be lost. The recording capabilities may allow for a video out feed so that the video may be transmitted to an external recording system via any of the systems discussed herein such as wireless, wired, Bluetooth, near field communication, or a combination thereof. The recording capabilities may be part of a discrete module that may be connected to the display device. For example, the display device may be connected to a sonar module in one port, a video module in a second port, and a recording module in a third port that records the input from port one and port two. The one or more imaging devices, the display device, the recording device, or a combination thereof may include zooming capabilities.

The zooming capabilities may function to zoom in on one or more features of interest. The zooming capabilities may occur real time, from a recording, or both. The zooming capabilities may zoom a camera, a transducer, or both. The zooming capabilities may allow a user to zoom in on a water column, a feature of interest, or both. For example, if most of the marine life are located within a depth of 10 feet to 20 feet the display device may zoom in so that the transducer and/or camera focuses only on that depth and excludes the other depths. The zooming capabilities may function to focus on a specific zone, region, column, depth, or a combination thereof. The zooming capabilities may function to allow for widening of the view so that a larger area or volume is being viewed. The zooming capabilities may be 1× or more, 2× or more, 2.5× or more, 3× or more, 5× or more, or even 10× or more. When the zooming capabilities are being used the sensitivity may be increased. For example, a more accurate depiction of a feature of interest such as content of the bottom, or a size of a fish may be shown. The one or more imaging devices may connect to a module housing, a display device, a streaming device, or a combination thereof.

The display device, one or more image modules, or both may be connected to one or more streaming devices via a wire and/or wirelessly (e.g., bluetooth, near field communication (NFC)). The one or more streaming devices may function to receive data and stream data. The one or more streaming devices may allow a user freedom to move and monitor a location of interest, underwater sea life, or both. The one or more streaming devices may provide information that is the same information as would be displayed on the display device as is shown on a wired display device. The one or more streaming devices may function to receive signals and process the signals and then stream the signals to a display device. The one or more streaming devices may allow a user to monitor a location (e.g., a hole in the ice, or a spot in a boat) when the user is at a remote location so that the user is not tethered to the location. For example, the user may be cutting new holes while still monitoring an initial hole. In another example, the user may move about a boat and monitor activity without being constrained to a single location. In yet another example, the user may use the display device while at the steering wheel to monitor a GPS system or monitoring depth of the water in a specific location to support a draft of the boat and once angling has commenced the display device may be moved to the bow of the boat to monitor the bottom of the body of water, existence of fish, existence of forage, depth, temperature, structure, or a combination thereof. The streaming device may include one or more power packs. The streaming device may provide power to a display device, charge a display device, or both. The streaming device may provide docking for one or more display devices so that the display device may be visible by one or more users, charged during use, displayed during use, or a combination thereof. The one or more streaming devices may include one or more ports. The one or more ports may connect the streaming device to one or more image modules. The one or more ports may couple the one or more image modules to the streaming device so that the streaming device powers the image modules and transmits the signals to a display device. The streaming device may provide internet. The streaming device may include speakers, an MP3 player, a CD player, a tape deck, USB ports, a radio, or a combination thereof. The one or more display devices may include one or more carriers.

The one or more carriers may elevate the streaming device above a surface. The one or more carriers may elevate the streaming device above ice so that the display device, the streaming device, or both are not damaged, contacted by water, or both. The one or more carriers may be a platform that elevates the streaming, device. The one or more carriers may be a frame that connects to the streaming device and elevates the steaming device. The one or more carriers may be a formed tube that elevates the streaming device and/or display device above a surface. The one or more carriers may be located on each side of the streaming device and support the streaming device. The one or more carriers may be buoyant. The one or more carriers may be connected to and/or include skis so that the streaming device may be pulled. The one or more carriers may be formed of metal, plastic, a light weight material, a hollow material, a solid material, or a combination thereof. The one or more carriers may include and/or be connected to a container.

The one or more containers may function to hold equipment, protect equipment, suspend equipment above a surface, store an imaging device, store an imaging module, or a combination thereof. The one or more containers may be water resistant, water proof; or both. The one or more containers may store live bait, may include a bubbler, may store wet bait, may store dry bait, or a combination thereof. The one or more containers may store clothing such as hats; gloves, socks, the like or a combination thereof. The one or more containers may store lures, fishing line, fishing poles, fishing reels, or a combination thereof. The streaming device may include one or more antenna.

The antenna may function to provide a signal so that the signal may be displayed on a display device. The antenna may function to receive a signal such as a radio signal, a tv signal, or both is received by the streaming device. The antenna may have sufficient strength so that a signal is streamed to about 10 m or more, 50 m or more, 100 m or more, or even 1000 m or more.

The carrier, the streaming device, or both may include one or more handles for carrying the streaming device. Preferably, the carrier includes at least one centrally placed handle so that the streaming device may be carried with a single hand. The handle may be locate at a location on the streaming device so that the carrier is placed at a center of mass, the streaming device is balanced, or both. The handle may be located so that the streaming device may be pulled. The handle may be static. The handle may include one or more hinges. The handle may be storable so that the handle may be stored when the handle is not in use. The handle may be located adjacent to a docking station in the streaming device.

The docking station may function to electrically connect, signally connect, or both a display device to the streaming device and/or the one or more image modules. The docking station may receive a portion of the display device so that the display device is supported within the docking station. The docking station may have a portion that extends into the display device so that power, signals, or both are provided to and/or from the display device. The docking station may provide signals from one or more image modules that are connected to the streaming device to the display device for displaying an image.

The display device, image module, streaming device, or a combination thereof may be used in a method to provide images. The method may include a step of connecting an imaging device to a display device, a streaming device, or both. The imaging device may be powered and may provide power to an imaging module. The imaging module includes a module housing that receives one or more signals. The signal may be converted and/or decoded or encoded from analog to digital and then transmitted. The signals may be amplified by one or more pre amplifiers. The signal may be sent to a microprocessor, a converter that compresses the signal size, encodes the signal, decodes the signal, or a combination thereof. The signal may be converted in an analog to digital convert. The signal is encoded by a microprocessor and made digital. The digital signal may be transmitted from the module housing to the display device. The signal may be decoded, decompressed, or both. The signal may be sent to display device, where the display device decompresses the signal to generate a display. The signal may not be encoded, compressed, or both. The display device, module housing, or both may only compress, encode, decompress, decode, or a combination thereof if more than one image modules are present, being used, or both. The signal may not be saved in flash memory. The signal may only be saved in random access memory (RAM) so that the signal is displayed on the display screen substantially in real time. The signal may not be saved in any memory and may be transmitted directly to a display device so that the signal is displayed in substantially real time.

Figure 1:
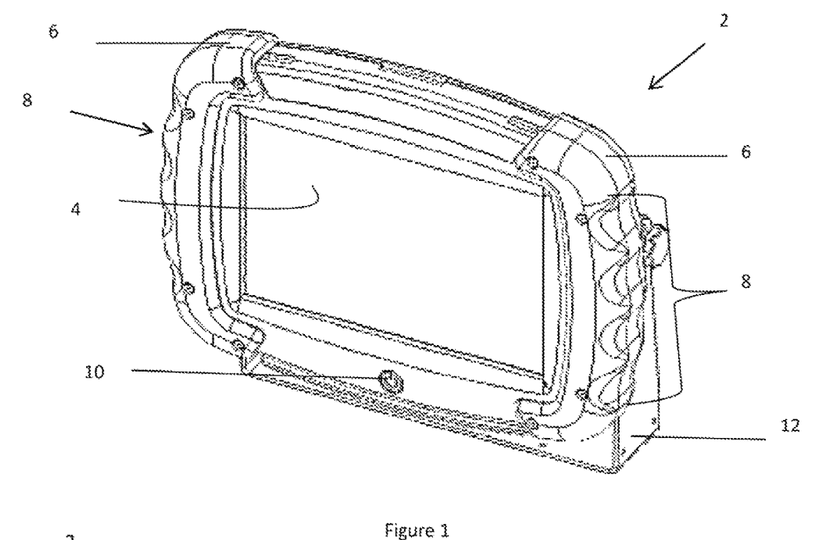
FIG. 1 illustrates a perspective view of a display device.

FIG. 1 illustrates a front perspective view of a display device 2. The display device 2 includes a display screen 4 with protective bumpers 6 around the display screen 4. The protective bumpers 6 include a gripping portion 8 to assist a user in holding the display device 2. A switch 10 is located on the display device 2 to control one or more functions of the display device 2. The display device 2 is connected to an attachment stand 12.

Figure 2:
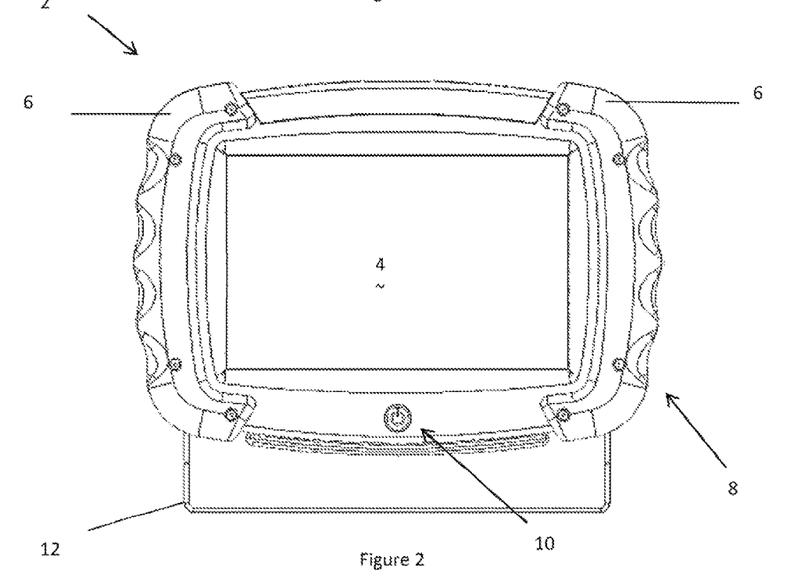
FIG. 2 illustrates a plan view of the front of the display device of FIG. 1.

FIG. 2 illustrates a front view of the display device 2. As shown the protective bumpers 6 cover the corners of the display device 2 and extend along the sides of the display device 2. The protective bumpers 6 are molded to include a gripping portion 8. A display screen 4 is located between the protective bumpers 6 and a switch 10 is located adjacent to the display screen 4. As illustrated, the display device 2 is mounted to an attachment stand 12, but the display screen may be removed from the attachment stand 12 and transported during operation.

Figure 3:
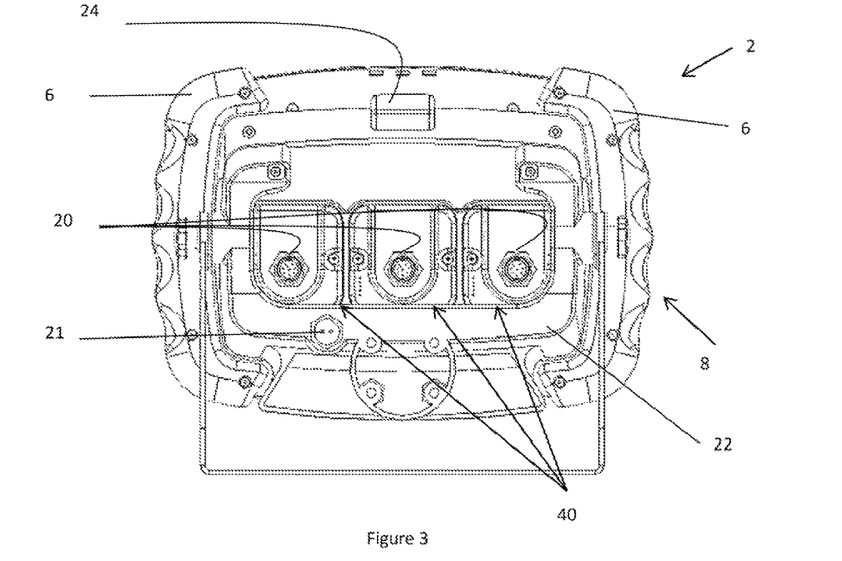
FIG. 3 illustrates a plan view of the rear of the display device of FIG. 1.

FIG. 3 illustrates a rear view of the display device 2. The gripping portion 6 is connected to the display device 2 and the gripping portion 8 extends along the sides and onto the back of the gripping portion 6. A docking cradle 22 is connected to the back of the display device 2 by a latch 24, and the docking cradle 22 includes a through hole that exposes a plurality of ports. 20 and a power port 21 that extend through the through hole in the docking cradle 22. The docking cradle 22 also includes a power port 21 so that a signal, power, or both can be supplied to the display device 2 through the docking cradle 22.

Figure 4A:
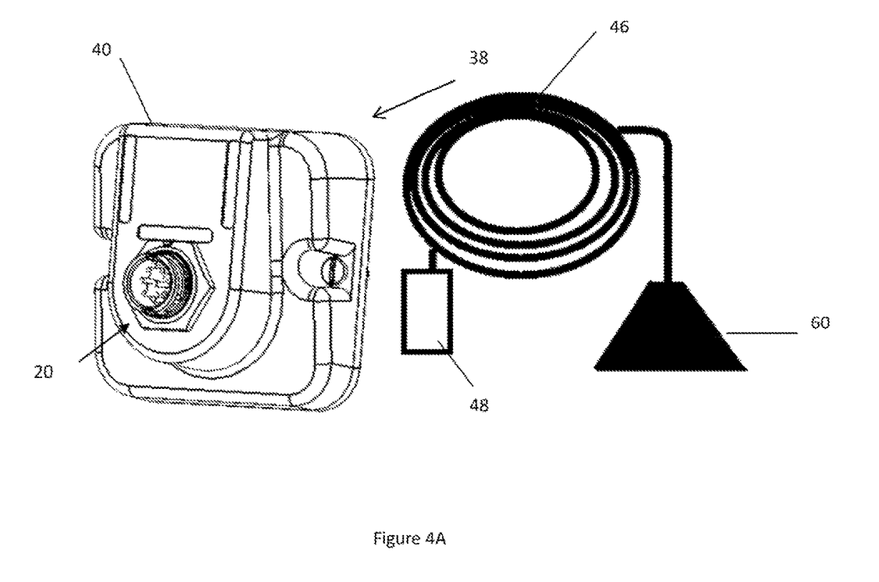
FIG. 4A illustrates an image module and a transducer.

FIG. 4A illustrates an image module 38 including a module housing 40 removed from the display device (not shown). The module housing 40 is connected to a transducer 60 by a module port 48 that is connected to the transducer 60 by a module cord 46. The module port 48 connects to a port 20 in the module housing 40 so that a signal and/or power is moved between the transducer 60 and the module housing 38. The module housing 40 includes drivers so that when the module housing 40 is connected to the display device (not shown) a display is generated and shown.

Figure 4B:
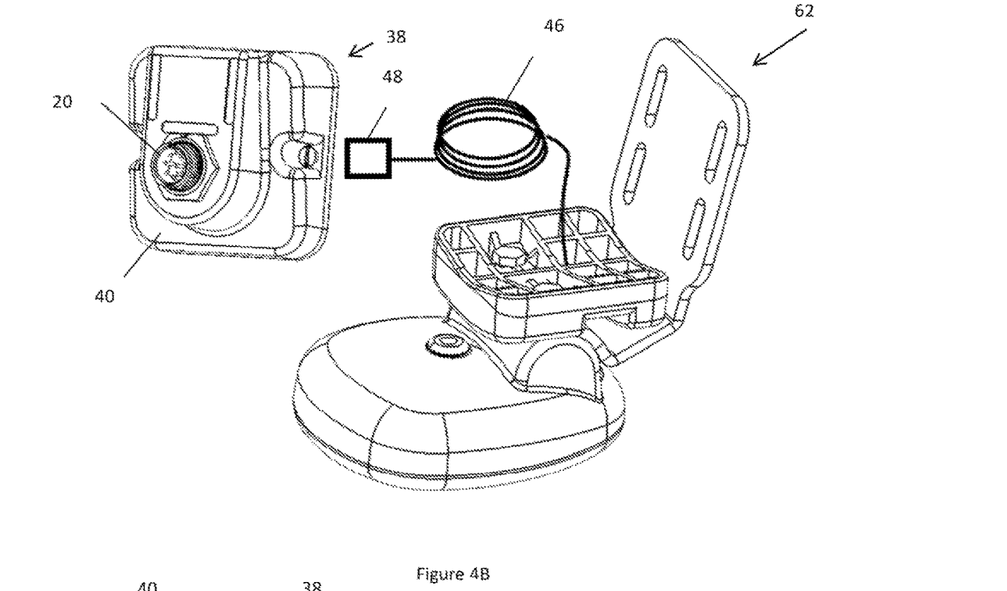
FIG. 4B illustrates an image module including an open water transducer.

FIG. 4B illustrates an image module 38 including a module housing 40 physically and electrically connected to an open water transducer 62. The housing module 40 includes a port 20 that receives a module port 48 that is connected to a module cord 46 for supplying signals, power, or both between the open water transducer 62 and the image module 38.

Figure 4C:
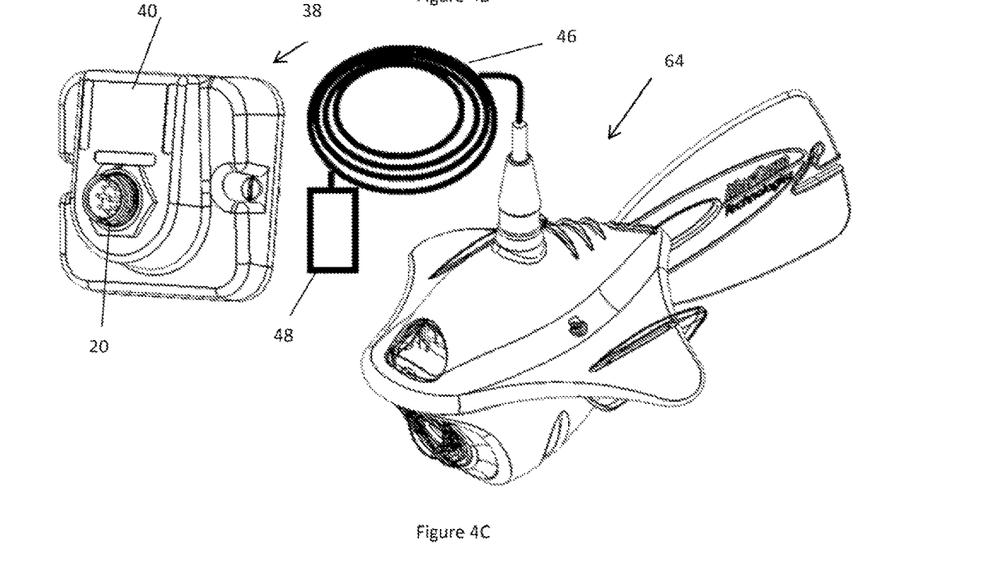
FIG. 4C illustrates an image module including a camera.

FIG. 4C illustrates an image module 38 including a module housing 40 with a port 20 for physically and electrically connected to a camera 64 so that once the module housing 40 is connected to the display device (not shown) images captured by the camera are displayed through the display device. The camera 64 includes a module cord 46 and a module port 48 that connect to the power of the image module 38 so that image signals, power, or both can be transmitted between the camera 64 and the image module 38.

Figure 5:
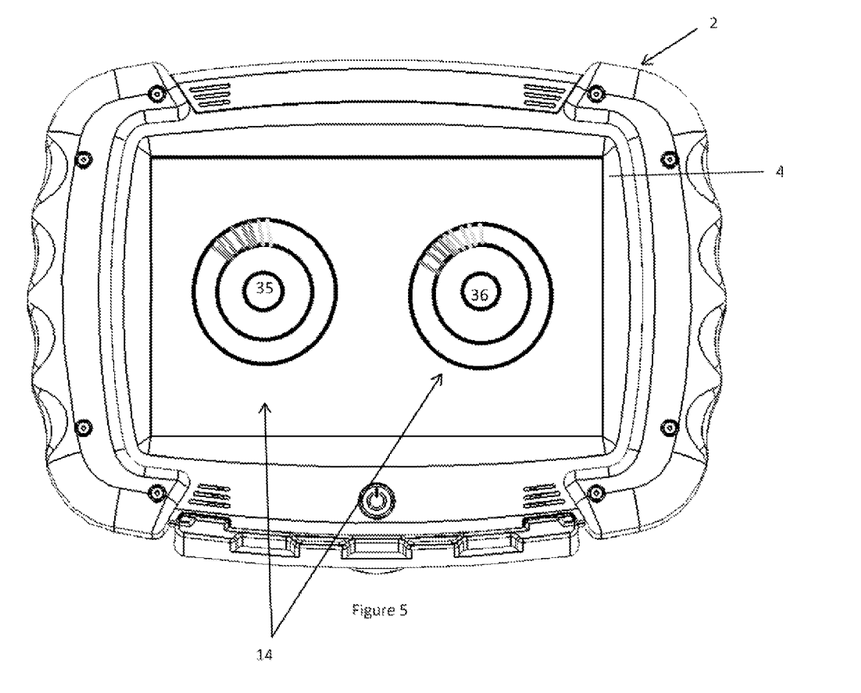
FIG. 5 illustrates a display device having a dual display displaying multiple hole locations.

FIG. 5 illustrates the display device 2 generating, a dual display 14 on the display screen 4.

Figure 6:
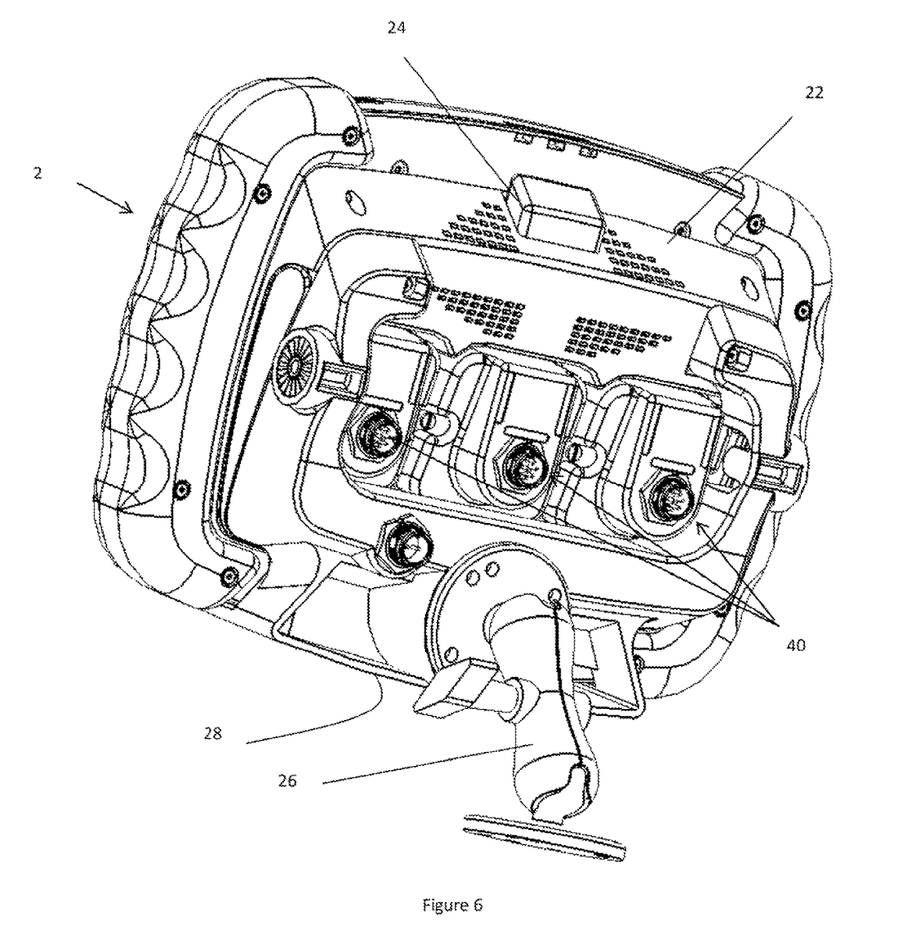
FIG. 6 illustrates a rear view of a display device including a docking cradle.

FIG. 6 illustrates another example of a docking cradle connected to a display device 2, The docking cradle 22 is connected to the display device 2 by a latch 24 and a support ledge 28. The docking cradle 22 includes a stand 26 that may be extended to support the display screen 2. A plurality of module housings 40 extend through the docking cradle 22 for attachment to one or more functional components (not shown).

Figure 6A:
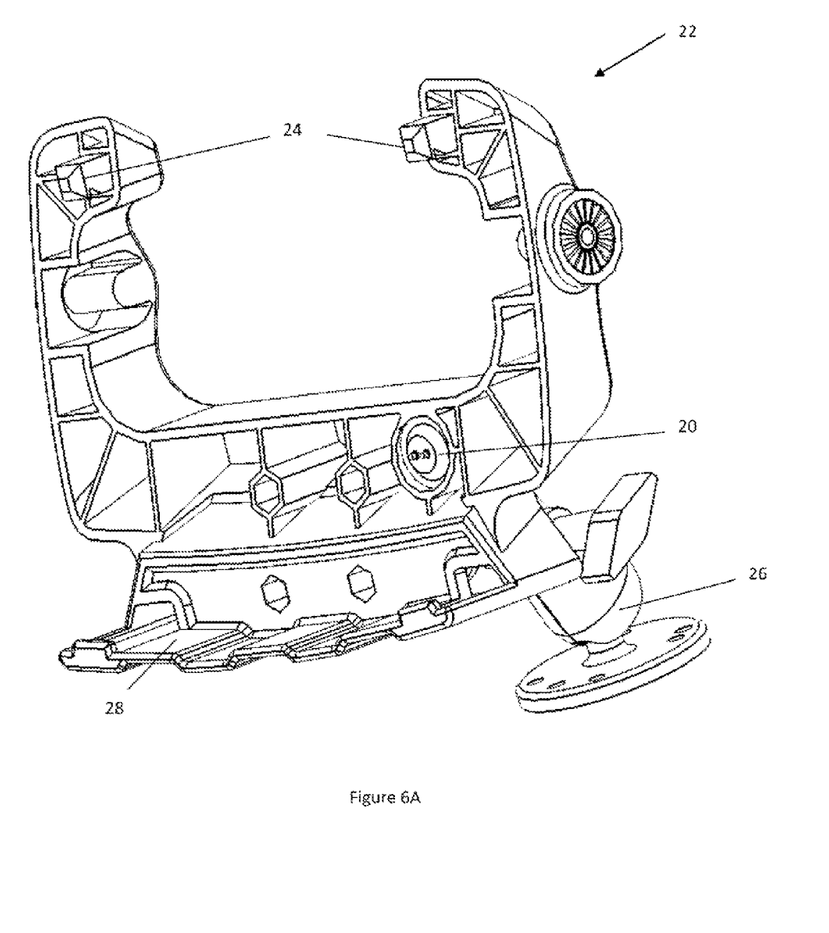
FIG. 6A illustrates a docking cradle with a display device removed.

FIG. 6A the docking cradle 22 includes a pair of latches 24 for connecting the docking cradle 22 to a display device (not shown), The docking cradle 22 also include a port 20 so that a signal, power, or both can be supplied to the display device (not shown) through the docking cradle 22. The docking cradle 22 includes a stand 26 that supports the display device (not shown) is a position where the display device can be viewed. A bottom of the display device (not shown) rests on a support ledge 28.

Figure 7:
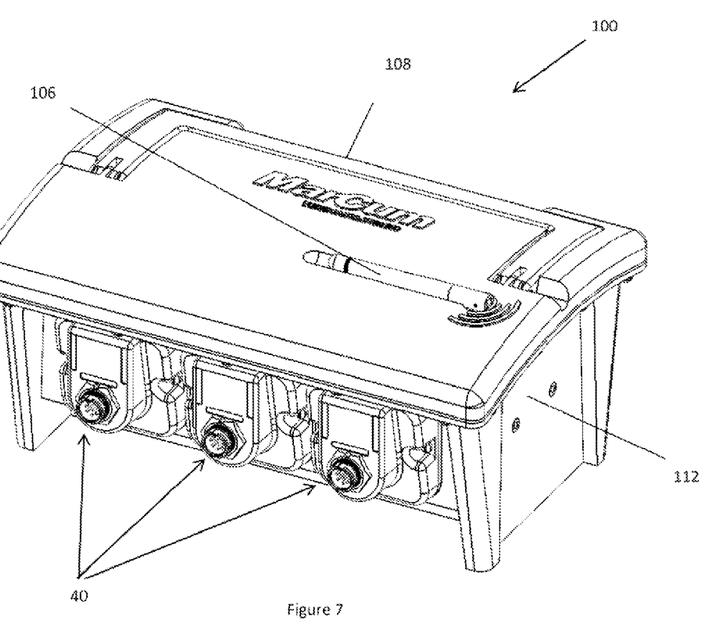
FIG. 7 illustrates a streaming device.

FIG. 7 illustrates a streaming device 100. The streaming device 100 may be supported by a carrier 102 (not shown) that elevates the electrical components of the streaming device 100. The carrier 102 (not shown) includes a container 110 (not shown) for elevating other containers above the support surface such as ice. The streaming device 100 may include a docking station 104 (not shown) for holding, displaying, and/or charging the display device (not shown) with the internal battery pack 112. The streaming device 100 includes an antenna 106 that streams signals to the display device for wireless communication. A handle 108 is located on the top of the streaming device 100 so that the streaming device can be easily moved. The streaming device 100 is connected to the plurality of module housings 40 so that the feed from the functional components (e.g., transducer, open water transducer, camera, or a combination thereof) can be fed into the streaming device 100 and transmitted to a remote display device 2 through the antenna 106 and displayed on the display device 2 (not shown). The present teachings provide a marine display device comprising: (a) a housing including one or more ports for connecting with one or more imaging devices that graphically or pictorially capture images of underwater sea life, (b) a display screen located within the housing that displays the graphical or pictorial images of underwater sea life, displays one or more global positioning satellite locations, one or more menu options, or a combination thereof, and (c) one or more sensors for detecting contact of the display screen by the user so that the contact by the user controls one or more functions of the marine display device: wherein the one or more sensors detect the contact of the user when the user is wearing gloves and the user is making contact with one or more fingers; the one or more sensors detect contact of a user when the device, the user, or both are wet; the one or more sensors have wet rejection; or a combination thereof. The additional teachings of the streaming device may be found throughout the present application including U.S. Patent Application Ser. No. 62/002,422, filed on May 23, 2014 FIG. 7 and paragraph nos. 007-008, 0020, 0030, 0032, 0036-0043, and 0052 all of which are expressly incorporated by reference herein for all purposes regarding the streaming device, antenna, carrier, docking station, handle, container, power pack, module housing, or a combination thereof.

The present teachings provide one or more of the following which may be used with one or more of the devices discussed herein: a marine streaming device comprising: (a) a carrier and (b) a housing connected to the carrier, the housing including: (i) one or more attachment points for receiving one or more image modules; (ii) one or more antennas that transmit wireless signals received from the one or more image modules; and (iii) one or more power packs; and wherein the marine streaming device transmits the wireless signals to one or more marine display devices so that the one or more display devices display graphic or pictorial images of underwater sea life; wherein signals from two or more image modules are simultaneously transmitted so that the two or more images may be overlaid, displayed side by side, or both; wherein the wireless signals are password protected, encrypted, or both; wherein the housing includes a docking station far receiving one of the one or more marine display devices; wherein the docking station powers the display device, connects the display device to the one or more image modules, or both; wherein the carrier includes one or more containers that store one or more articles, receive one or more containers, store a transducer, store a camera, or a combination thereof; wherein the housing includes one or more handles for moving the marine streaming device; wherein the carrier elevates the housing above a surface so that the housing is free of contact with the surface: wherein the housing includes speakers, headphone jacks, an MP3 player, or a combination thereof; wherein the one or more sensors detect the contact of the user when the user is wearing gloves and the user is making contact with one or more fingers; the one or more sensors detect contact of a user when the device, the user, or both are wet, the one or more sensors have wet rejection; or a combination thereof, wherein the one or more sensors detect capacitance created by the user during the contact between the user and the display screen; wherein the one or more sensors function in conditions below about 5° C. or less, preferably about 0° C. or less, or even more preferably about −10° C. or less; wherein the one or more sensors are free of resistive sensing;

wherein the marine display device includes a plurality of ports for connecting the marine display device to one or more imaging devices; wherein the image module pre-processes a signal before the signal is sent to display device so that the display device is substantially free of any processing of the signal: substantially all processing is performed in the image module (i.e., about 60 percent or more, preferably about 70 percent or more, or more preferably about 80 percent or more of the processing); or a combination of both; or a combination, thereof.

The present teachings provide a method that may include one or more of the following steps that may be performed in virtually any order a method comprising: (a) connecting one or more image modules to one or more display device, a streaming device, or both; (b) placing one or more imaging devices in water; (c) transmitting a signal from each of the one or more imaging devices to the image module; (d) converting the signal from each of the one or more imaging devices; and (e) displaying the converted signal on the one or more display devices; wherein two or more images are displayed side by side; wherein two or more images are overlaid; wherein the one or more signals are streamed from the streaming device to one or more display devices; wherein the method includes a step of monitoring one or more imaging devices from a location remote to the imaging modules; wherein the method includes a step of rejecting one or more signals from one or more adjacent image modules; wherein the image modules are the image modules of any of the teachings herein, the display device is the display device of any of the teachings herein, and the streaming device is the streaming device of any of the teachings herein; or a combination thereof.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or one to describe en element, ingredient, component or step is not intended to foreclose additional elements, ingredients, components or steps.

2 Display Device
4 Display Screen
6 Protective bumper
8 Gripping portion
10 Switch
12 Attachment stand
14 Dual Display
20 Port
21 Power Port
22 Docking Cradle
24 Latch
26 stand
28 Support Ledge
38 Image Module
40 Module Housing
42 Power Pack
44 Drivers
46 Power Cord
48 Power Port
60 Transducer
62 Open water transducer
64 Camera
100 Streaming device
102 Carrier
104 Docking station
106 Antenna
108 Handle
110 Container
112 Power pack

We claim:
1. A marine display device comprising:
  a. a housing,
  b. two or more ports;
  c. two or more image devices;
  d. two or more image modules, each of the two or more image modules including:
    i. one or more components that process an image generated by one of the two or more imaging devices;
    ii. a port that connects each of the two or more image modules to one of the two or more ports of the marine display so that the image modules are capable of being connected and removed from the marine display and
    iii. a port that connects one of the two or more imaging devices to one of the two or more image modules so that graphical or pictorial images of underwater sea life captured by one of the two or more imaging devices can be transmitted from the one of the two or more imaging devices to one of the two or more image modules;
  e. a display screen located within the housing that displays the graphical or pictorial images of underwater sea life, displays one or more global positioning satellite locations, one or more menu options, or a combination thereof,
  f. one or more sensors for detecting contact of the display screen by the user so that the contact by the user controls one or more functions or the marine display device; and
  g. one or more internal power supplies;
    wherein the marine display device is a fish finder that is portable and displays the graphical or pictorial images of underwater sea life without being connected to an external power source; and
    wherein each of the two or more image modules are discrete from each of the two or more imaging devices and are capable of connecting one the two or more imaging devices to the marine display device so that each the two or more imaging devices operate a distance from each the two or more image modules and the marine display device.

2. The marine display of claim 1, wherein each of the two or more image modules are free of an internal power supply.

3. The marine display of claim 1, wherein each of the two or more image modules pre-process a signal before the signal is sent to the marine display device so that the marine display device is substantially free of any processing of the signal; substantially all processing is performed in each of the two or more image modules; or a combination of both.

4. The marine display of claim 1, wherein each of the two or more imaging devices measures depth, water temperature, speed, and direction of each of the two or more imaging devices.

5. The marine display of claim 1, wherein each of the two or more imaging devices are controllable through the marine display device so that the imaging device is focused, a view is adjusted, or both.

6. The marine display of claim 1, wherein each of the two or more imaging devices are a transducer, an open water transducer, a camera, or a combination thereof.

7. The marine display of claim 1, wherein each of the two or more image modules include an independent interference rejecter that rejects signals from an adjacent one of the two or more image modules.

8. The marine display of claim 5, wherein each of the two or more image modules automatically adjusts a foot print of a transducer as the depth of the water chances.

9. The marine display of claim 8, wherein the foot print of a sonar signal produced is varied by a user, automatically, through a predetermined range, or a combination thereof.

10. The marine display device of claim 1, wherein the marine display device includes one or more wireless receivers that receive the graphical or pictorial images of underwater sea life.

11. The marine display device of claim 1, wherein two or more ports of the marine display device physically connect, electrically connect, signally connect, or a combination thereof to one or more streaming devices that transfer power, signals, graphical images, pictorial images, or a combination thereof to the marine display device.

12. The marine display device of claim 1, wherein the marine display device includes a docking cradle that connect the marine display device to an external power source.

13. The marine display device of claim 1, wherein the docking cradle includes a stand that supports the marine display device in an elevated position.

14. The marine display device of claim 1, wherein the marine display device operates on the one or more internal power supplies when in a handheld operation and operates on an external power source when docked, being charged, mounted in a fixed position, or a combination thereof.

15. The image module of claim 1, wherein each of the two or more image modules include a module housing that includes one more printed circuit boards, one or more microprocessors, filters, memory, random access memory, analog to digital converters, digital to analog converters, flash memory, or a combination thereof.

16. The image module of claim 1, wherein each of the two or more image modules add function to the marine display that are desired by a user so that the marine display performs the added function.

17. The image module of claim 1, wherein each of the two or more image modules include recording capabilities so that when an event occurs the user can save and store the event.

18. The marine display of claim 1, wherein the display screen is a single display and the single display depicts an image from each of the two or more image modules on the single display by segregating the single display screen into two or more displays.

* * * * *

UNITED STATES PATENT AND TRADEMARK OFFICE
CERTIFICATE OF CORRECTION

PATENT NO. : 9,967,506 B2  
APPLICATION NO. : 14/718365  
DATED : May 8, 2018  
INVENTOR(S) : Jon D. Marshall, Rocky J. Holmes and Steven R. Hanson Page 1 of 1

It is certified that error appears in the above-identified patent and that said Letters Patent is hereby corrected as shown below:

In the Claims

Column 17, Line 24, Claim 8, delete "water chances." and insert --water changes.--

Signed and Sealed this  
Eleventh Day of December, 2018

Andrei Iancu  
*Director of the United States Patent and Trademark Office*